(12) United States Patent
White

(10) Patent No.: US 8,996,764 B1
(45) Date of Patent: *Mar. 31, 2015

(54) METHOD AND APPARATUS FOR CONTROLLING TRANSMISSION OF DATA PACKETS FROM AND TO A SERVER

(71) Applicant: Marvell International Ltd., Hamilton (BM)

(72) Inventor: Martin White, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,508

(22) Filed: May 12, 2014

Related U.S. Application Data

(63) Continuation of application No. 13/867,714, filed on Apr. 22, 2013, now Pat. No. 8,738,825, which is a continuation of application No. 12/831,835, filed on Jul. 7, 2010, now Pat. No. 8,429,316.

(60) Provisional application No. 61/230,632, filed on Jul. 31, 2009.

(51) Int. Cl.
*G06F 5/00* (2006.01)
*G06F 13/40* (2006.01)

(52) U.S. Cl.
CPC .................................. *G06F 13/4022* (2013.01)
USPC .............. 710/58; 710/1; 710/5; 710/6; 710/7; 710/20; 710/29; 710/33; 710/62

(58) Field of Classification Search
None
See application file for complete search history.

(56) References Cited

U.S. PATENT DOCUMENTS

| 7,916,760 | B2 | 3/2011 | Fujimoto et al. |
| 8,085,666 | B2 | 12/2011 | Higashida |
| 2007/0014268 | A1 | 1/2007 | Kim et al. |
| 2007/0189305 | A1 | 8/2007 | Fujimoto et al. |
| 2009/0201927 | A1 | 8/2009 | Lund et al. |
| 2011/0021235 | A1 | 1/2011 | Laroia et al. |

*Primary Examiner* — Idriss N Alrobaye
*Assistant Examiner* — Dayton Lewis-Taylor

(57) ABSTRACT

Some of the embodiments of the present disclosure provide a method comprising categorizing each data packet of a plurality of data packets into one of at least two priority groups of data packets; and controlling transmission of data packets of a first priority group of data packets during a first off-time period such that during the first off-time period, data packets of the first priority group of data packets are prevented from being transmitted to a switching module from one or more server blades. Other embodiments are also described and claimed.

20 Claims, 5 Drawing Sheets

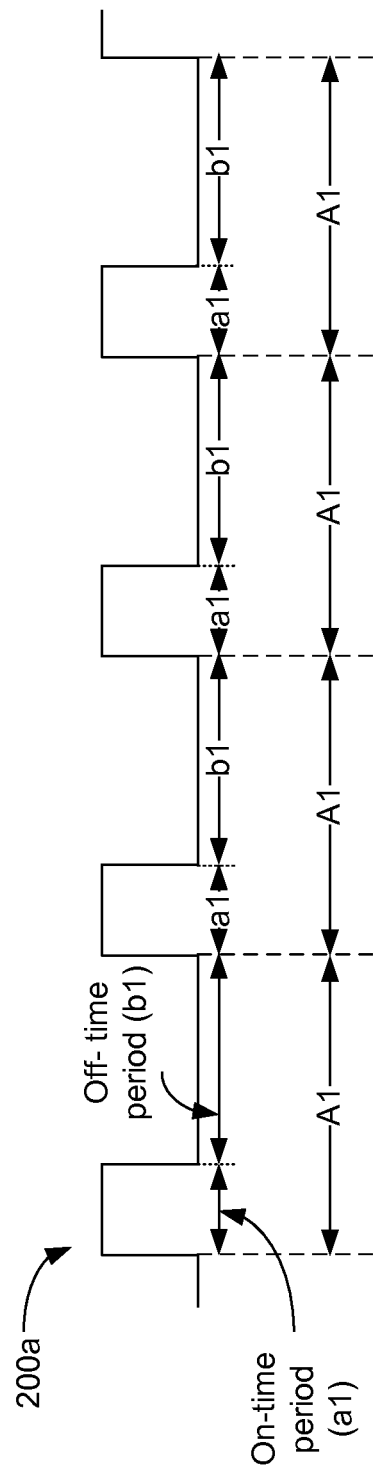

METHOD AND APPARATUS FOR CONTROLLING TRANSMISSION OF DATA PACKETS FROM AND TO A SERVER

CROSS REFERENCE TO RELATED APPLICATIONS

The present disclosure is a continuation of and claims priority to U.S. patent application Ser. No. 13/867,714, filed Apr. 22, 2013, now U.S. Pat. No. 8,738,825, issued May 27, 2014, which is a continuation of and claims priority to U.S. patent application Ser. No. 12/831,835, filed Jul. 7, 2010, now U.S. Pat. No. 8,429,316, issued Apr. 23, 2013, which claims priority to U.S. Provisional Patent Application No. 61/230,632, filed Jul. 31, 2009, which are incorporated herein by reference.

TECHNICAL FIELD

Embodiments of the present invention relate to a blade server system in general, and more specifically, to a low power state of a switch in a blade server system.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

A high density blade server system typically includes a plurality of server modules (hereinafter also referred to as server blades). By arranging the plurality of server blades in a multi-server cabinet, the high density blade server system achieves significant cost and space savings over a plurality of conventional stand-alone servers. These savings result directly from the sharing of common resources, e.g., common power supplies, common cooling systems, enclosures, etc., and the reduction of space required by this type of multi-server system, while providing a significant increase in available computing power. A blade server system usually includes one or more switches configured to route data packets in the blade server system.

A modern centralized data processing center generally has several (e.g., numbering even in the hundreds) such blade server systems. Power consumption per unit of computing power decreases with a blade server system compared to, for example, a system that comprises a plurality of conventional stand alone servers. However, the larger number of server blades within a blade server system, and the large number of such blade server systems in a data processing center results in significant power consumption. Thus, a marketability of a blade server system is at least in part tied to a power usage by the blade server system.

SUMMARY

In various embodiments, the present disclosure provides a method comprising categorizing each data packet of a plurality of data packets into one of at least two priority groups of data packets; and controlling transmission of data packets of a first priority group of data packets during a first off-time period such that during the first off-time period, data packets of the first priority group of data packets are prevented from being transmitted to a switching module from one or more server blades.

BRIEF DESCRIPTION OF THE DRAWINGS

In the following detailed description, reference is made to the accompanying drawings wherein like numerals designate like parts throughout.

FIG. 2a illustrates a timing curve for controlling transmission of data packets from a plurality of server blades to a switching module of FIG. 1.

DETAILED DESCRIPTION

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Figure 1:
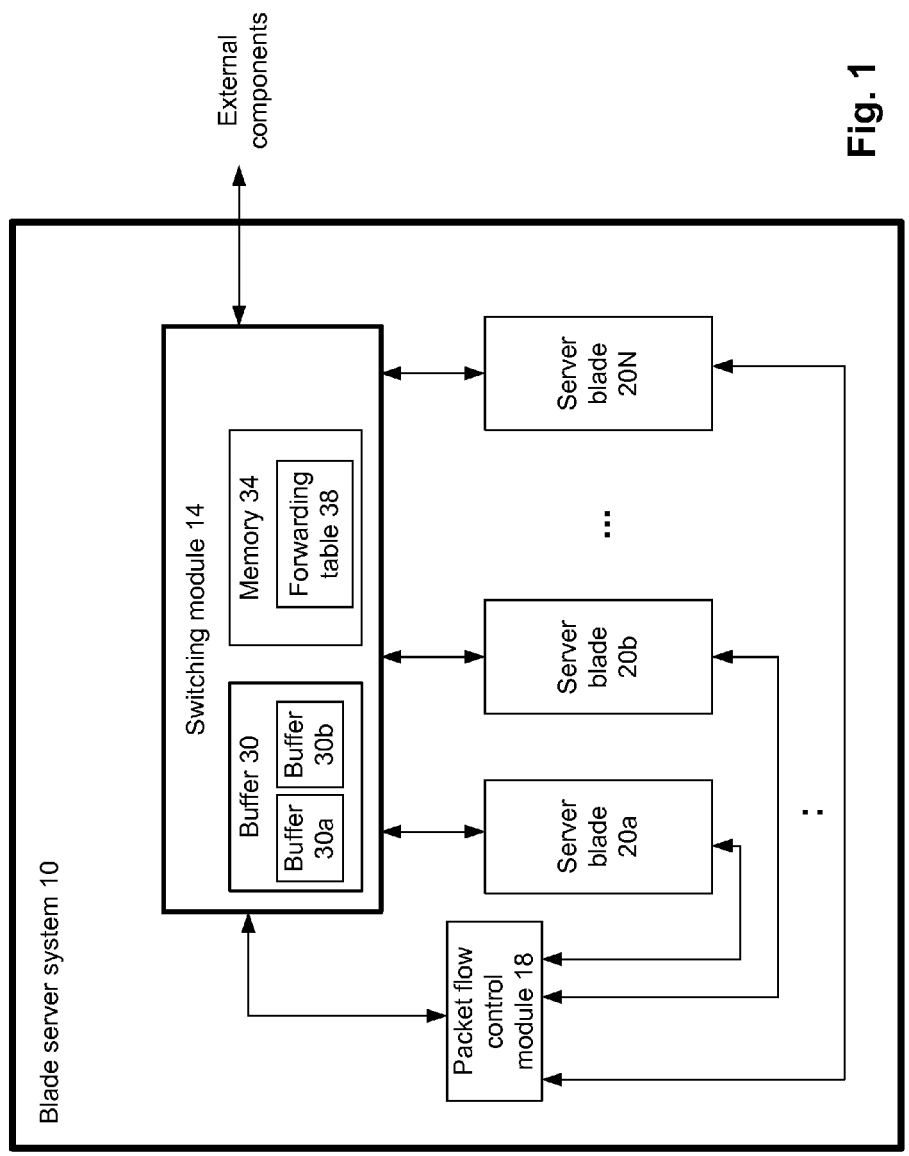
FIG. 1 schematically illustrates a blade server system.

FIG. 1 schematically illustrates a blade server system 10, in accordance with various embodiments of the present disclosure. The blade server system 10 includes a plurality of server blades 20a, . . . , 20N. Although not illustrated in FIG. 1, individual server blades of the plurality of server blades 20a, . . . , 20N include one or more processors, memory, a host bus adaptor, an input/output port, and/or the like.

The blade server system 10 also includes a switching module 14 that is communicatively coupled to each of the plurality of server blades 20a, . . . , 20N through appropriate communication links. Although only one switching module 14 is illustrated in FIG. 1, in various other embodiments, the blade server system 10 may include more than one switching module.

The switching module 14 receives data packets from one or more of the server blades 20a, . . . , 20N and/or from one or more components that are external to the blade server system 10. The switching module 14 selectively routes the received data packets to an appropriate destination (e.g., to one or more of the server blades 20a, . . . , 20N and/or to one or more components that are external to the blade server system 10). Thus, the switching module 14 facilitates transmission of data packets (i) between individual server blades of the plurality of server blades 20a, . . . , 20N, and/or (ii) between a server blade of the plurality of server blades 20a, ..., 20N and a component external to the blade server system 10. In various embodiments, data packets include data bits associated with user data, control data, and/or the like.

The switching module 14 includes several components, only some of which is illustrated in FIG. 1. For example, switching module 14 includes a buffer 30 and a memory 34. In various embodiments, the buffer 30 is divided in two (or more) sections, illustrated as buffer 30a and buffer 30b in FIG. 1. The memory 34 may be any suitable volatile memory (e.g., a dynamic random access memory) or non-volatile memory.

The switching module 14 also includes a forwarding table 38 configured to store routing information associated with the data packets received by the switching module 14. Although illustrated as a separate component, in various embodiments, the forwarding table 38 is stored in the memory 34.

The blade server system 10 also includes a packet flow control module 18, which is communicatively coupled to the switching module 14 and to the server blades 20a, ..., 20N. The packet flow control module 18 is communicatively coupled to the switching module 14 and to the server blades 20a, ..., 20N using, for example, appropriate communication links, one or more device drivers, and/or appropriate application program interfaces (APIs). Although illustrated as a separate component in FIG. 1, in various other embodiments, the packet flow control module 18 may be included in the switching module 14 and/or in one of the blade servers 20a, ..., 20N.

Although not illustrated in FIG. 1, the blade server system 10 also includes several other components. For example, although not illustrated in FIG. 1, the blade server system 10 includes one or more power supply modules configured to supply power to various components of the blade server system 10, one or more cooling modules configured to provide cooling to various components of the blade server system 10, and/or the like.

In various embodiments, the packet flow control module 18 controls an ingress or transmission of data packets from the server blades 20a, ..., 20N to the switching module 14. FIG. 2a illustrates a timing curve 200a for controlling transmission of data packets from the server blades 20a, ..., 20N to the switching module 14 of FIG. 1, in accordance with various embodiments of the present disclosure. In various embodiments, control signals corresponding to the timing curve 200a is generated by the packet flow control module 18, and is received by one or more server blades 20a, ..., 20N and/or the switching module 14 of FIG. 1. Referring to FIGS. 1 and 2, during an on-time period a1, the packet flow control module 18 allows flow of data packets from one or more of the server blades 20a, ..., 20N to the switching module 14. On the other hand, during an off-time period b1, the packet flow control module 18 prevents flow of data packets from one or more of the server blades 20a, ..., 20N to the switching module 14.

The on-time period a1 and off-time period b1 form a timing pattern A1. In various embodiments, the timing pattern A1 is repeated a number of times, as illustrated in FIG. 2a. That is, each timing pattern A1 includes an on-time period a1 and an off-time period b1. Thus, an on-time period a1 is followed by an off-time period b1, which is followed again by another on-time period a1, and so on.

For the purpose of this disclosure and unless otherwise disclosed, an on-time period a1 and an off-time period b1 may refer to any one of the plurality of on-time periods a1 and any one of the plurality of off-time periods b1, respectively, as illustrated in FIG. 2a. For the purpose of this disclosure and unless otherwise disclosed, on-time periods a1 may refer to more than one on-time period a1 (e.g., all the on-time periods a1 illustrated in FIG. 2a). For the purpose of this disclosure and unless otherwise disclosed, off-time periods b1 may refer to more than one off-time period b1 (e.g., all the off-time periods b1 illustrated in FIG. 2a). For the purpose of this disclosure and unless otherwise disclosed, a timing pattern A1 may refer to any one of the plurality of timing patterns A1 illustrated in FIG. 2a. For the purpose of this disclosure and unless otherwise disclosed, timing patterns A1 may refer to more than one timing pattern A1 (e.g., all the timing patterns A1 illustrated in FIG. 2a).

Referring again to FIGS. 1 and 2a, a server blade (e.g., server blade 20a) transmits a data packet to the switching module 14 during an on-time period a1. However, if the server blade 20a desires to transmit another data packet to the switching module 14 during an off-time period b1, transmission of the another data packet from the server blade 20a to the switching module 14 is paused until a start of a next on-time period a1.

In various embodiments, controlling of the data packets (e.g., selectively pausing a data packet from transmission from the server blade 20a to the switching module 14 during off-time periods b1), by the packet flow control module 18, may be in compliance with or performed using, for example, any appropriate flow control protocol. For example, an appropriate Ethernet pause flow control protocol (e.g., Institute of Electrical and Electronics Engineers (IEEE) 802.3x standard, approved in 1997), an appropriate priority-based flow control protocol (e.g., IEEE 802.1qbb, which is presently at drafting stage), and/or any other appropriate flow control protocol is used to control the data packets.

During the off-time periods b1, the switching module 14 operates in a low power state. In various embodiments, while the switching module 14 is in the low power state, one or more components of the switching module 14 operate in a low power mode, a deep power down mode, and/or may be switched off. For example, while the switching module 14 is in the low power state (e.g., during the off-time periods b1), the buffer 30 and/or the memory 34 operate in the low power mode and/or the deep power down mode. In another example, dynamic power to one or more components of the switching module 14 is reduced during the low power state of the switching module 14. In yet another example, static power to one or more other components of the switching module 14 is switched off during the low power state of the switching module 14. As the switching module 14 does not receive any data packets during the off-time periods b1 (i.e., during the low power state), operating, by the switching module 14, in the low power state during the off-time periods b1 does not result in any loss of any data packets transmitted to the switching module 14.

On the other hand, during the on-time periods a1, the switching module 14 operates at a regular power state. In various embodiments, while the switching module 14 is in the regular power state, one or more components (e.g., buffer 30, memory 34, and/or the like) of the switching module 14 operate at a regular or normal power level.

Referring again to FIG. 2a, a duty cycle of the blade server system 10, associated with the timing curve 200a, refers to a ratio of (i) a duration of an on-time period a1, and (ii) a duration of a timing pattern A1. In various embodiments, the duty cycle may be expressed in percentage form. Thus, the duty cycle associated with the timing curve 200a is equal to $(a1/A1) \times 100$, i.e., equal to $(a1/(a1+b1)) \times 100$. The duty cycle is a representation of a percentage of time the switching module 14 operates at the regular power state and routes data packets to appropriate destinations.

A load factor of the blade server system 10 may be, for example, associated with a number of data packets transmitted within the blade server system 10. In various embodiments, the duty cycle of the switching mode 14 is varied based at least in part on, for example, the load factor of the blade server system 10. In an example, the load factor of the blade server system 10 is high during day time, medium during the evenings, and low at night. Accordingly, for example, the duty cycle of the blade server system 10 is high (e.g., 70%) during day time, is medium (e.g., 40%) during the evenings, and is low (e.g., 10%) at night.

In various embodiments, the duty cycle is varied dynamically based at least in part on the load factor of the blade server system 10. In an example, the current duty cycle of the blade server system 10 is about 50%. However, the current load factor the blade server system 10 is higher than a load factor that can be supported by the duty cycle of 50%. Accordingly, data packets may get accumulated in, for example, one or more queues included in corresponding one or more of the server blades 20a, ..., 20N. In the case where a number of data packets accumulated in one or more queues exceeds a threshold value, the packet flow control module 18 dynamically increases the duty cycle. Such an increase in the duty cycle allows the switching module 14 to operate in the regular power state for more time duration. This provides more time to the switching module 14 to handle and route data packets accumulated in the one or more queues, thereby decreasing the number of data packets accumulated in the one or more queues.

On the other hand, in the case where a number of data packets accumulated in one or more queues decreases below another threshold value, the duty cycle of the switching module 14 is decreased dynamically by the packet flow control module 18, as will be readily understood by those skilled in the art based on the teachings of this disclosure.

Operating in the low power state, by the switching module 14, has several advantages. For example, while in the low power state, one or more components of the switching module 14 operate in a low power mode, a deep power down mode, and/or are switched off, resulting in significant savings in power consumed by the switching module 14, without adversely impacting a computing power or performance of the blade server system 10. Due to relatively less power consumption, the blade server system 10 generates relatively less heat, resulting in reduced cooling requirements for the blade server system 10.

In various embodiments, the packet flow control module 18 prioritizes data packets transmitted by the server blades 20a, ..., 20N to the switching module 14. For example, the packet flow control module 18 categorizes each of the data packets in one of a plurality of priority groups based on an importance or criticality of the respective data packet. The packet flow control module 18 controls transmission of data packets from the server blades 20a, ..., 20N to the switching module based on an associated priority group of the data packets.

For example, the packet flow control module 18 prioritizes data packets, transmitted by the server blades 20a, ..., 20N to the switching module 14, in a high priority group and a regular priority group. Data packets included in the high priority group has higher priority relative to the data packets included in the regular priority group. For the purpose of this disclosure and unless otherwise disclosed, a regular priority data packet refers to a data packet included in the regular priority group of data packets, and a high priority data packet refers to a data packet included in the high priority group of data packets.

Packet flow control module 18 categorizes the data packets in accordance with, for example, an appropriate priority-based flow control protocol (e.g., IEEE 802.1qbb and/or IEEE 802.1Q-2005, approved on 2005). For example, IEEE 802.1Q-2005 prioritizes different classes of traffic (voice, video, data, etc) in 7 different priority levels, with a priority level of 0 implying lowest priority and a priority level of 7 implying highest priority. In various embodiments, of the 7 priority levels defined in the IEEE 802.1Q-2005 protocol, data packets associated with priority levels 0-5 may be included in the regular priority group of data packets, and data packets associated with priority levels 6-7 may be included in the high priority group of data packets. However, such prioritization is purely an example, and in various other embodiments, any other number of priority groups, using any other appropriate priority-based flow control protocol (or any other appropriate protocol), may also be possible.

Figure 2B:
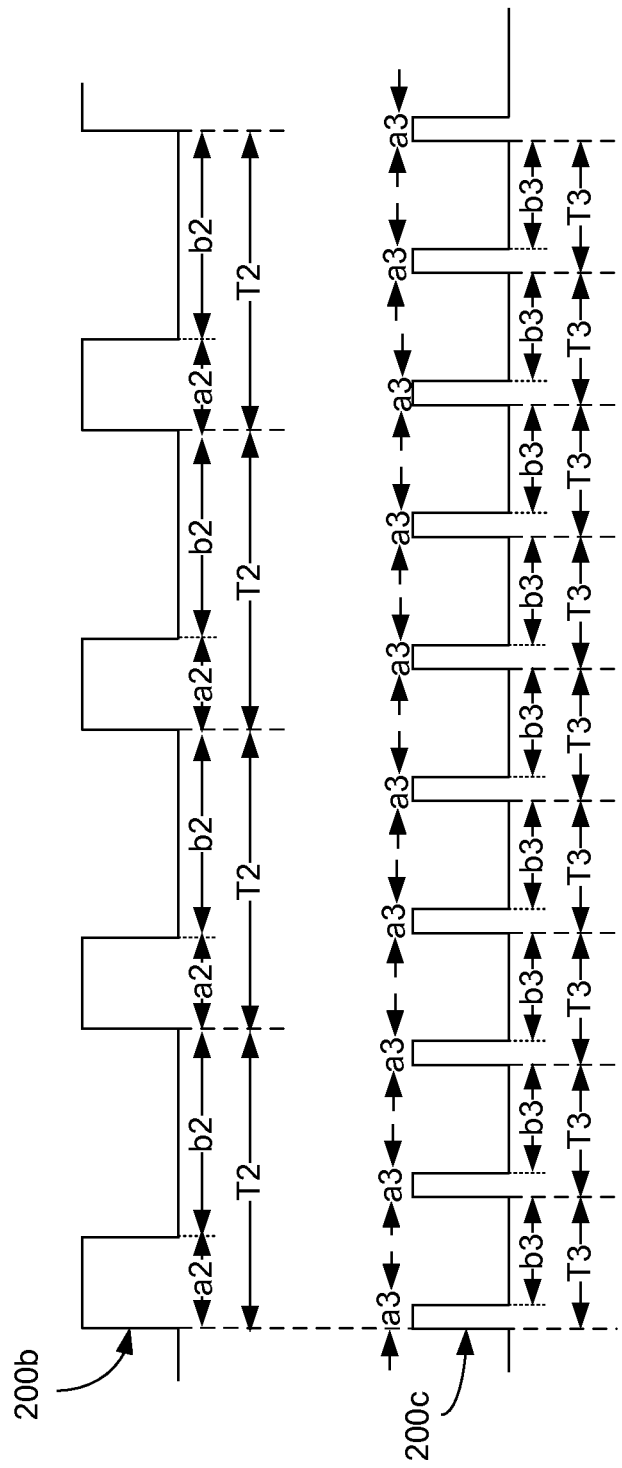
FIG. 2b illustrates a first timing curve and a second timing curve for controlling transmission of (i) data packets included in a regular priority group of data packets, and (ii) data packets included in a high priority group of data packets, respectively, from the plurality of server blades to the switching module of FIG. 1.

FIG. 2b illustrates timing curves 200b and 200c for controlling transmission of (i) data packets included in the regular priority group of data packets, and (ii) data packets included in the high priority group of data packets, respectively, from the server blades 20a, ..., 20N to the switching module 14, in accordance with various embodiments of the present disclosure.

Referring to the timing curve 200b of FIG. 2b and to FIG. 1, during an on-time period a2, the packet flow control module 18 allows flow of data packets, included in the regular priority group, from one or more of the server blades 20a, ..., 20N to the switching module 14. On the other hand, during an off-time period b2, the packet flow control module 18 prevents or pauses flow of data packets, included in the regular priority group, from one or more of the server blades 20a, ..., 20N to the switching module 14.

The on-time period a2 and off-time period b2 form a timing pattern A2. In various embodiments, the timing pattern A2 is repeated a number of times, as illustrated in FIG. 2b. That is, each timing pattern A2 includes an on-time period a2 and an off-time period b2. Thus, an on-time period a2 is followed by an off-time period b2, which is followed again by another on-time period a2, and so on.

For example, a sever blade (e.g., server blade 20a) transmits a regular priority data packet to the switching module 14 during the on-time period a2. However, if the server blade 20a desires to transmit another regular priority data packet to the switching module 14 during the off-time period b2, transmission of the another regular priority data packet from the server blade 20a to the switching module 14 is paused or delayed (e.g., using any appropriate flow control protocol, as previously disclosed) until a start of a next on-time period a2.

The timing curve 200c similarly illustrates controlling of data packets included in the high priority group of data packets (e.g., controlling of high priority data packets). For example, in the timing curve 200c, during an on-time period a3, the packet flow control module 18 allows flow of data packets, included in the high priority group, from one or more of the server blades 20a, ..., 20N to the switching module 14. On the other hand, during an off-time period b3, the packet flow control module 18 prevents flow of data packets, included in the high priority group, from one or more of the server blades 20a, ..., 20N to the switching module 14.

The on-time period a3 and off-time period b3 form a timing pattern A3. In various embodiments, the timing pattern A3 is repeated a number of times, as illustrated in FIG. 2b. That is, each timing pattern A3 includes an on-time period a3 and an off-time period b3. Thus, an on-time period a3 is followed by an off-time period b3, which is followed again by another on-time period a3, and so on.

For example, a sever blade (e.g., server blade 20a) transmits a high priority data packet to the switching module 14 during an on-time period a3. However, if the server blade 20a desires to transmit another high priority data packet to the switching module 14 during an off-time period b3, transmission of the another high priority data packet from the server blade 20a to the switching module 14 is paused or delayed (e.g., using any appropriate flow control protocol, as previously disclosed) until a start of a next on-time period a3.

The switching module 14 operates in a first level of low power state during the off-time periods b2, and operates in a second level of low power state during the off-time periods b3. One or more components of the switching module 14 operates in a low power mode, a deep power down mode, or are switched off during the first level of low power state and/or the second level of low power state.

As previously disclosed, the buffer 30 of the switching module 14 is segmented in buffer 30a and buffer 30b. In various embodiments, the buffer 30a is configured to buffer data packets included in the regular priority group of data packets, and the buffer 30b is configured to buffer data packets included in the high priority group of data packets. Accordingly, during the first level of low power state of the switching module 14, buffer 30a operates in the low power mode, the deep power down mode, or is switched off. On the other hand, during the second level of low power state of the switching module 14, buffer 30b operates in the low power mode, the deep power down mode, or is switched off. If the first level of low power state and the second level of low power state of the switching module 14 coincide, both the buffer 30a and the buffer 30b operate in the low power mode, the deep power down mode, and/or are switched off.

In various embodiments, a number of regular priority data packets routed by the switching module 14 is higher than a number of high priority data packets routed by the switching module 14. Accordingly, the buffer 30a is larger in size compared to the buffer 30b.

If a buffer enters a deep power mode, the buffer may take relatively more time to exit the deep power mode (e.g., as compared to a time taken for exiting from a low power mode). Furthermore, if a buffer is switched off, data stored in the buffer may be lost while the buffer is switched on once again.

In various embodiments, the buffers 30a and/or 30b operate in the low power mode, the deep power down mode, or are switched off based at least in part of a number of data packets buffered in the buffers 30a and/or 30b. In an example, in the case where the buffer 30a is empty before the switching module 14 enters the first level of low power state, the buffer 30a then operates in the deep power down mode or is switched off. In another example, in the case where the buffer 30b stores one or more data packets before the switching module 14 enters the second level of low power state, the buffer 30b then operates in the low power mode (e.g., instead of operating in the deep power down mode or being switched off) during the second level of low power state (e.g., so that the buffered one or more data packets are not lost, and the buffer 30a exits the low power mode relatively quickly).

Although not illustrated in FIG. 1, in various embodiments, the memory 34 may also be segmented into two sections of memory: a first section of memory associated with (e.g., configured to store) data packets included in the regular priority group of data packets, and a second section of memory associated with data packets included in the high priority group of data packets. In such a case, the first section of memory operates in the low power mode, the deep power down mode, or is switched off during the first level of low power state of the switching module 14. On the other hand, the second section of memory operates in the low power mode, the deep power down mode, or is switched off during the second level of low power state of the switching module 14. In the case where the first level of low power state and the second level of low power state of the switching module 14 coincide, both the sections of memory operate in the low power mode, the deep power down mode, and/or are switched off.

In various embodiments, if a number of regular priority data packets routed by the switching module 14 is higher than a number of high priority data packets routed by the switching module 14, the first section of memory is relatively larger (e.g., has relatively larger storage space) than the second section of memory.

The switching module 14 operates in a first level of regular power state during the on-time periods a2, and operates in a second level of regular power state during the on-time periods a3. While the switching module 14 is in the first level of regular power state, one or more components (e.g., buffer 30a, the first section of the memory 34, and/or the like) of the switching module 14, which are associated with routing the regular priority data packets, operate at a regular or normal power level. Similarly, while the switching module 14 is in the second level of regular power state, one or more components (e.g., buffer 30b, the second section of the memory 34, and/or the like) of the switching module 14, which are associated with routing the high priority data packets, operate at a regular or normal power level.

As illustrated in FIG. 2b, an on-time period a2 associated with the timing curve 200b is relatively small compared to an on-time period a3 associated with the timing curve 200c. Furthermore, as illustrated in FIG. 2b, a timing pattern A2 associated with the timing curve 200b is relatively small compared to a timing pattern A3 associated with the timing curve 200c. As illustrated in FIG. 2b, the on-time periods a3 occur more frequently compared to occurrence of the on-time periods a2 (although the duration of each on-time period a3 is smaller than the duration of each on-time period a2). Furthermore, as illustrated in FIG. 2b, a duty cycle associated with the timing curve 200c (which is equal to $(a3/(a3+b3))\times 100$)) is smaller than a duty cycle associated with the timing curve 200b (which is equal to $(a2/(a2+b2))\times 100$)).

Accordingly, in various embodiments, high priority data packets are transmitted more frequently from the server blades 20a, . . . , 20N, compared to regular priority data packets, thereby decreasing a latency period of high priority data packets (e.g., compared to a latency period of regular priority of data packets). However, as a number of high priority data packets routed by the switching module 14 is lower than a number of regular priority data packets routed by the switching module 14, each on period a3 is smaller compared to each on period a2 (e.g., due to less time required for routing the lower number of high priority data packets).

In various embodiments, the duty cycles associated with the timing curves 200b and/or 200c are varied dynamically based at least in part on the load factor of the blade server system 10. Such variations of the duty cycles may be similar to the variation of the duty cycle associated with the timing curve 200a, as previously disclosed herein.

Selectively operating in the first level of low power state and the second level of low power state, by the switching module 14, has several advantages. For example, the first level of low power state and the second level of low power state result in significant savings in power consumed by the switching module 14, which also result in lower cooling requirements for the blade server system 10. Furthermore, categorizing data packets in different priority groups, and having different duty cycles for the different priority groups of data packets also has several advantages. For example, as previously disclosed, high priority data packets are transmitted more frequently from the server blades 20a, . . . , 20N, compared to regular priority data packets. This ensures that the blade server system 10 saves power through the various low power states, without sacrificing the ability to promptly and timely handling high priority data packets.

Figure 3:
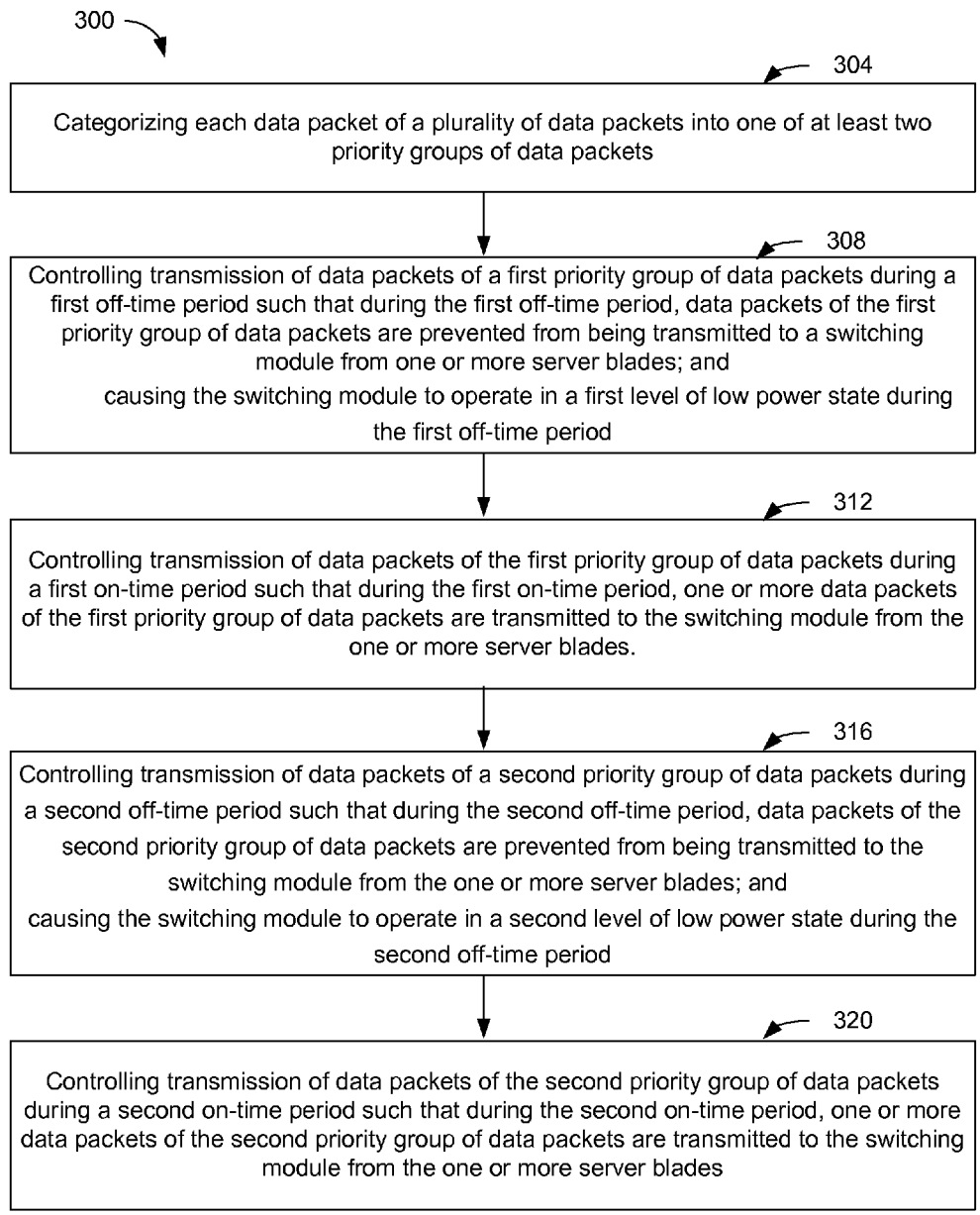
FIG. 3 illustrates a method for operating the blade server system of FIG. 1.

FIG. 3 illustrates a method 300 for operating the blade server system 10 of FIG. 1, in accordance with various embodiments of the present disclosure. Referring to FIGS. 1, 2b and 3, the method 300 includes, at 304, categorizing (e.g., by the packet flow control module 18) each data packet of a plurality of data packets into one of at least two priority groups of data packets (e.g., a first priority group of data packets that correspond to the regular priority group of data packets, and a second priority group of data packets that correspond to the high priority group of data packets).

The method further comprises, at 308, controlling (e.g., by the packet flow control module 18) transmission of data packets of the first priority group of data packets during a first off-time period (e.g., off-time period b2) such that during the first off-time period, data packets of the first priority group of data packets are prevented from being transmitted to a switching module (e.g., switching module 14) from one or more server blades (e.g., one or more of the server blades 20a, . . . , 20N). At 308, the packet flow control module 18 also causes the switching module to operate in a first level of low power state during the first off-time period.

The method further comprises, at 312, controlling (e.g., by the packet flow control module 18) transmission of data packets of the first priority group of data packets during a first on-time period (e.g., on-time period a2) such that during the first on-time period, one or more data packets of the first priority group of data packets are transmitted to the switching module from the one or more server blades. During the first on-time period, the switching module may operate in the first level of regular power state, as previously disclosed.

The method further comprises, at 316, controlling (e.g., by the packet flow control module 18) transmission of data packets of the second priority group of data packets during a second off-time period (e.g., off-time period b3) such that during the second off-time period, data packets of the second priority group of data packets are prevented from being transmitted to the switching module from the one or more server blades. At 316, the packet flow control module 18 also causes the switching module to operate in a second level of low power state during the second off-time period.

The method further comprises, at 320, controlling (e.g., by the packet flow control module 18) transmission of data packets of the second priority group of data packets during a second on-time period (e.g., on-time period a3) such that during the second on-time period, one or more data packets of the second priority group of data packets are transmitted to the switching module from the one or more server blades. During the first on-time period, the switching module may operate in the second level of regular power state, as previously disclosed.

Various operations of the method 300 may not occur in the sequence illustrated in FIG. 3. For example, one or more operations associated with blocks 308 and/or 312 may occur at least in part simultaneously with one or more operations associated with blocks 316 and/or 320, as will be readily understood by those skilled in the art based at least in part on the teachings of the disclosure. Furthermore, although not illustrated in FIG. 3, one or more operations associated with blocks 308, . . . , 320 may be repeated for a plurality of times, as will be readily understood by those skilled in the art based at least in part on the teachings of the disclosure.

Figure 4:
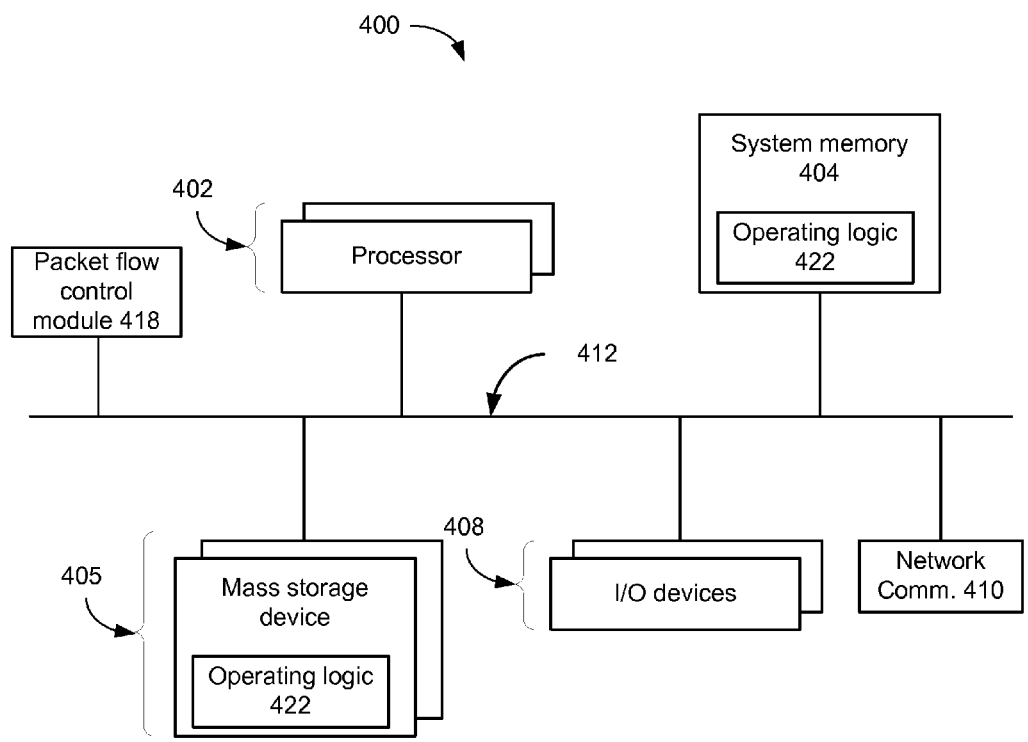
FIG. 4 is a block diagram of a system suitable for practicing embodiments of the present disclosure.

FIG. 4 is a block diagram of an illustrative system 400 suitable for practicing the embodiments of the present disclosure. As illustrated, system 400 includes one or more processors or processor cores 402, and system memory 404. For purposes of this disclosure, including the claims, the terms "processor" and "processor cores" may be considered synonymous, unless the context clearly requires otherwise. Additionally, system 400 includes mass storage devices 406 (such as diskette, hard drive, compact disc read only memory (CDROM) and so forth), input/output devices 408 (such as a display to render visual manifestation, a keyboard, a cursor control, and so forth) and communication interfaces 410 (such as network interface cards, modems and so forth). The elements of FIG. 4 may be coupled to each other via system bus 412, which represents one or more buses. In the case of multiple buses, they may be bridged by one or more bus bridges (not illustrated).

System memory 404 and mass storage 406 may be employed to store a working copy and a permanent copy of the programming instructions implementing all or a portion of earlier described functions, herein collectively denoted as 422. The instructions 422 may be assembler instructions supported by processor(s) 402 or instructions that can be compiled from high level languages, such as C or other suitable high level programming languages.

A permanent copy of the programming instructions is stored into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various computing devices.

The system 400 is included in or is associated with the blade server system 10 of FIG. 1. In various embodiments, the system 400 includes a packet flow control module 418 communicatively coupled to the system bus 412. The packet flow control module 418 is at least in part similar to the packet flow control module 18 of FIG. 1. Although not illustrated in FIG. 4, the system 400 may be communicatively coupled to a plurality of server blades (e.g., server blades 20a, . . . , 20N of FIG. 1) and a switching module (e.g., switching module 14 of FIG. 1).

In various embodiments, one or more instructions associated with the packet flow control module 418 are stored as instructions 422. In various embodiments, the system 400 (e.g., the processor 402) is configured to execute one or more instructions to cause the system 400 (e.g., the packet flow control module 418) to execute one or more operations of method 300 of FIG. 3 (and/or one or more operations associated with controlling various operations of the blade server system 10, as disclosed in this disclosure).

In embodiments of the present disclosure, an article of manufacture (not illustrated) implements one or more methods as disclosed herein. For example, in various embodiments, an article of manufacture may comprise a storage medium and a plurality of programming instructions stored in the storage medium and adapted to program a computing device to configure the computing device to execute one or more operations associated with controlling various operations of the blade server system 10 (e.g., one or more operations of method 300 of FIG. 3, one or more operations associated with controlling transmission of data packets in the blade server system 10, and/or one or more operations associated with controlling a state (e.g., low power state, regular power state, etc.) of the switching module 14, as disclosed in this disclosure).

Although specific embodiments have been illustrated and described herein, a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment disclosed herein.

What is claimed is:

1. A method for transmitting a plurality of data packets between a switching module and a server of a server system, the method comprising:
   controlling transmission of the plurality of data packets during a first time period such that during the first time period, data packets of the plurality of data packets are prevented from being transmitted between the server and the switching module;
   controlling transmission of the plurality of data packets during a second time period such that during the second time period, data packets of the first plurality of data packets are permitted to be transmitted between the server and the switching module, wherein a duty cycle corresponds to a ratio of (i) a duration of the second time period, and (ii) a sum of (a) a duration of the first time period and (b) a duration of the second time period; and
   based on a load factor of the switching module, controlling the duty cycle by dynamically varying the first time period and the second time period.

2. The method of claim 1, wherein the first time period and the second time period form a first timing pattern, and wherein the method further comprises:
   repeating the first timing pattern a plurality of times, resulting in a plurality of first timing patterns, such that
      for the first time period of each of the plurality of first timing patterns, data packets of the plurality of data packets are prevented from being transmitted between the server and the switching module, and
      for the second time period of each of the plurality of first timing patterns, data packets of the first plurality of data packets are permitted to be transmitted between the server and the switching module.

3. The method of claim 1, wherein the plurality of data packets is a first plurality of data packets, wherein each data packet of the first plurality of data packets has a first priority, wherein each data packet of a second plurality of data packets has a second priority, wherein the duty cycle is a first duty cycle, and wherein the method further comprises:
   controlling transmission of the second plurality of data packets during a third time period such that during the third time period, data packets of the second plurality of data packets are prevented from being transmitted between the server and the switching module;
   controlling transmission of the second plurality of data packets during a fourth time period such that during the fourth time period, data packets of the second plurality of data packets are permitted to be transmitted between the server and the switching module, wherein a second duty cycle corresponds to a ratio of (i) a duration of the fourth time period, and (ii) a sum of (a) a duration of the third time period and (b) a duration of the fourth time period; and
   based on the load factor of the switching module, controlling the second duty cycle by dynamically varying the third time period and the fourth time period.

4. The method of claim 3, wherein a first sum comprises the sum of the duration of the first time period and the duration of the second time period, wherein a second sum comprises the sum of the duration of the third time period and the duration of the fourth time period, and wherein controlling the first duty cycle and the second duty cycle further comprises:
   based on the first priority being higher than the second priority, controlling the first duty cycle and the second duty cycle such that the first sum is smaller than the second sum.

5. The method of claim 3, wherein controlling the first duty cycle and the second duty cycle further comprises:
   based on the first priority being higher than the second priority, controlling the first duty cycle and the second duty cycle such that the first time period is smaller than the second time period.

6. The method of claim 3, further comprising:
   causing the switching module to operate in a first low power state during the first time period; and
   causing the switching module to operate in a second low power state during the third time period.

7. The method of claim 6, wherein:
   the switching module comprises (i) a first buffer configured to buffer one or more of the first plurality of data packets, and (ii) a second buffer configured to buffer one or more of the second plurality of data packets; and
   the method further comprises
      causing the first buffer to operate in a low power mode during the first low power state, and
      causing the second buffer to operate in the low power mode during the second low power state.

8. The method of claim 3, further comprising:
   receiving a first data packet;
   categorizing the first data packet into having one of the first priority or the second priority; and
   based on categorizing the first data packet into having one of the first priority or the second priority, transmitting the first data packet between the server and the switching module during one of the second time period or the fourth time period.

9. The method of claim 8, wherein transmitting the first data packet between the server and the switching module further comprises:
   in response to categorizing the first data packet into having the first priority, transmitting the first data packet between the server and the switching module during the second time period.

10. The method of claim 8, wherein transmitting the first data packet between the server and the switching module further comprises:
    in response to categorizing the first data packet into having the second priority, transmitting the first data packet between the server and the switching module during the fourth time period.

11. A system for transmitting a plurality of data packets between a switching module and a server, the system comprising:
the switching module;
the server communicatively coupled to the switching module; and
a packet flow control module configured to
control transmission of the plurality of data packets during a first time period such that during the first time period, data packets of the plurality of data packets are prevented from being transmitted between the server and the switching module,
control transmission of the plurality of data packets during a second time period such that during the second time period, data packets of the first plurality of data packets are permitted to be transmitted between the server and the switching module, wherein a duty cycle corresponds to a ratio of (i) a duration of the second time period, and (ii) a sum of (a) a duration of the first time period and (b) a duration of the second time period, and
based on a load factor of the switching module, control the duty cycle by dynamically varying the first time period and the second time period.

12. The system of claim 11, wherein the first time period and the second time period form a first timing pattern, and wherein the packet flow control module is further configured to:
repeat the first timing pattern a plurality of times, resulting in a plurality of first timing patterns, such that
for the first time period of each of the plurality of first timing patterns, data packets of the plurality of data packets are prevented from being transmitted between the server and the switching module, and
for the second time period of each of the plurality of first timing patterns, data packets of the first plurality of data packets are permitted to be transmitted between the server and the switching module.

13. The system of claim 11, wherein the plurality of data packets is a first plurality of data packets, wherein each data packet of the first plurality of data packets has a first priority, wherein each data packet of a second plurality of data packets has a second priority, wherein the duty cycle is a first duty cycle, and wherein the packet flow control module is further configured to:
control transmission of the second plurality of data packets during a third time period such that during the third time period, data packets of the second plurality of data packets are prevented from being transmitted between the server and the switching module;
control transmission of the second plurality of data packets during a fourth time period such that during the fourth time period, data packets of the second plurality of data packets are permitted to be transmitted between the server and the switching module, wherein a second duty cycle corresponds to a ratio of (i) a duration of the fourth time period, and (ii) a sum of (a) a duration of the third time period and (b) a duration of the fourth time period; and
based on the load factor of the switching module, control the second duty cycle by dynamically varying the third time period and the fourth time period.

14. The system of claim 13, wherein a first sum comprises the sum of the duration of the first time period and the duration of the second time period, wherein a second sum comprises the sum of the duration of the third time period and the duration of the fourth time period, and wherein the packet flow control module is configured to control the first duty cycle and the second duty cycle by:
based on the first priority being higher than the second priority, controlling the first duty cycle and the second duty cycle such that the first sum is smaller than the second sum.

15. The system of claim 13, wherein the packet flow control module is configured to control the first duty cycle and the second duty cycle by:
based on the first priority being higher than the second priority, controlling the first duty cycle and the second duty cycle such that the first time period is smaller than the second time period.

16. The system of claim 13, wherein the packet flow control module is further configured to:
cause the switching module to operate in a first low power state during the first time period; and
cause the switching module to operate in a second low power state during the third time period.

17. The system of claim 16, wherein the switching module comprises:
a first buffer configured to buffer one or more of the first plurality of data packets; and
a second buffer configured to buffer one or more of the second plurality of data packets,
wherein the packet flow control module is further configured to
cause the first buffer to operate in a low power mode during the first low power state, and
cause the second buffer to operate in the low power mode during the second low power state.

18. The system of claim 13, wherein the switching module is configured to:
receive a first data packet, wherein the first data packet is categorized into having one of the first priority or the second priority; and
based on the first data packet being categorized into having one of the first priority or the second priority, cause the first data packet to be transmitted between the server and the switching module during one of the second time period or the fourth time period.

19. The system of claim 18, wherein the switching module is further configured to:
based on the first data packet being categorized into having the first priority, cause the first data packet to be transmitted between the server and the switching module during the second time period.

20. The system of claim 18, wherein the switching module is further configured to:
based on the first data packet being categorized into having the second priority, cause the first data packet to be transmitted between the server and the switching module during the fourth time period.

* * * * *